Sept. 21, 1954  A. B. JONES, JR  2,689,772
SEALING ASSEMBLY
Filed Feb. 16, 1951
FIG_1_
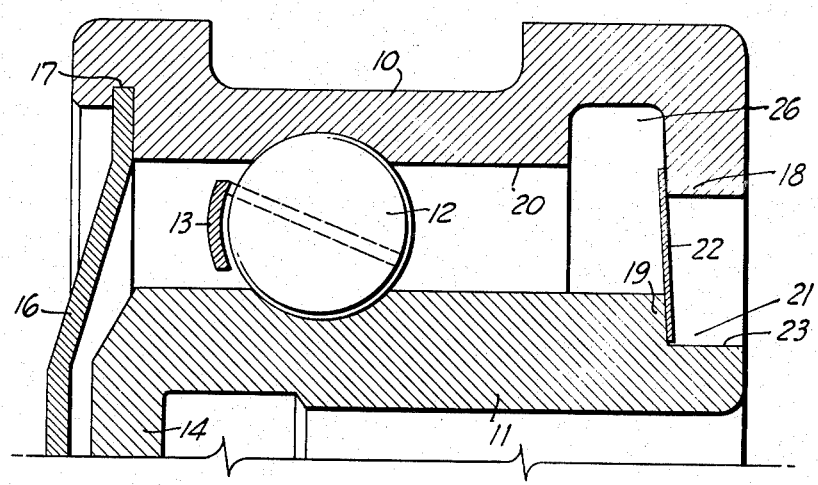
FIG_2_
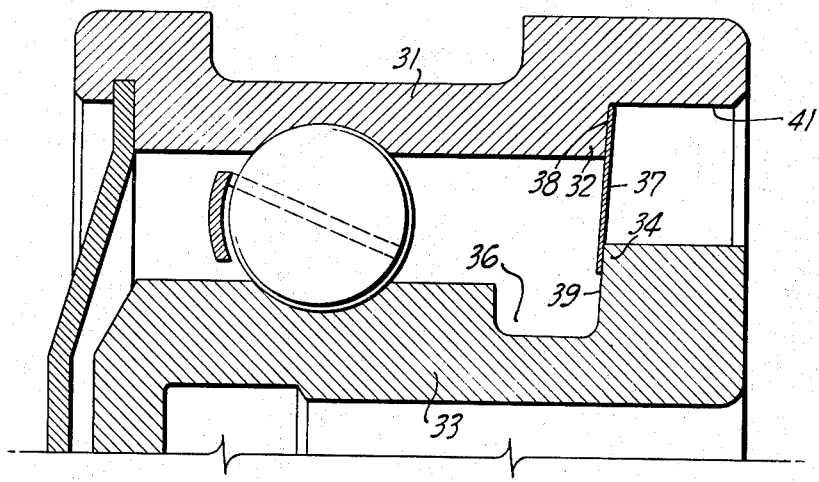
INVENTOR.
Arthur B. Jones, Jr.
BY
ATTORNEYS Patented Sept. 21, 1954

2,689,772

UNITED STATES PATENT OFFICE 2,689,772

SEALING ASSEMBLY

Arthur B. Jones, Jr., Newington, Conn., assignor, by mesne assignments, to Saywell Associates, South San Francisco, Calif., a joint venture Application February 16, 1951, Serial No. 211,369

4 Claims. (Cl. 308—187.2)

This invention relates generally to seals for preventing leakage of lubricant, and more particularly to ball or roller bearing assemblies having one or more built in lubricant seals.

In the past ball and roller bearing assemblies have been made with various types of built in lubricant seals. Such assemblies have been found advantageous for many types of service, particularly where it is inconvenient or impossible to supply lubricant during use, or where it is desirable or essential that the lubricant be confined within the ball bearing assembly. Seals of this type employ parts made of materials like rubber, leather and spring metal. An all metal seal has certain desirable inherent characteristics, including ability to withstand high temperatures without deterioration, but presents problems with respect to quantity low cost manufacture.

It is an object of the present invention to provide a novel and improved all metal seal for a ball or roller bearing assembly, and which in particular will be relatively simple in construction and inexpensive to manufacture.

Another object of the invention is to provide an improved seal which will not require the use of lock-in rings or like parts.

Additional objects of the invention will appear from the following description in which the preferred embodiments of the invention have been set forth in detail in conjunction with the accompanying drawing.

Referring to the drawing:

Figure 1 is an enlarged cross-sectional detail illustrating a ball bearing assembly equipped with one of my seals.

Figure 2 is a view like Figure 1 and showing a modification.

The ball bearing assembly as illustrated in Figure 1 includes the outer and inner races 10 and 11, together with the bearing balls 12. The assembly in this instance is of the type intended to be applied to the end of a rotating shaft, and the inner race 11 is sealed by the end wall 14. The corresponding end of the outer race 10 is likewise sealed by the closure 16, which has its outer periphery engaged within an annular groove 17 formed in the outer race.

The outer race 10 is formed to provide the annular shoulder 18, which is faced toward the interior of the assembly, and which in this instance extends to a diameter smaller than the diameter of the main bore through the race.

The inner race 11 is machined to form the outwardly faced annular shoulder 19 which can be conveniently formed by machining an annular recess 21 in the end of the race. Extending into overlapping relation with both the shoulders 18 and 19, there is a spring metal annulus 22. The inner diameter of the annulus 22 is slightly greater than the cylindrical periphery 23 of the recess 21. The outer diameter of the annulus is slightly less than the diameter of the main bore 20.

The annulus is formed of relatively thin spring metal, such as high carbon blue spring steel, Phosphor bronze, or one of the so-called stainless steels. Its thickness may vary with the size of the bearing assembly, and with the properties of the particular metal or metal alloy employed. However good results have been secured by using material having a thickness ranging from 0.004 to 0.010 inch, for bearing assemblies of the more common shaft sizes.

Normally the spring metal annulus is formed planor, and the faces of the shoulders 18 and 19 are so positioned with respect to each other in the final assembly that the annulus is sprung within its elastic limit, substantially to the form illustrated in Figure 1. This lateral stressing of the annulus serves to urge the outer and inner margins of the annulus into sealing engagement with the oppositely faced shoulders 18 and 19. As shown more particularly in Figure 1, the outer and inner margins of the annulus overlap the faces of the shoulders 18 and 19 by a substantial amount. As measured in a radial direction, the overlap area in each instance is many times greater than the thickness of the material.

Adjacent the inner face of the shoulder the outer race is provided with a relief groove or recess 26 which extends to a diameter substantially greater than the diameter of bore 20. This recess facilitates assembly during manufacture.

The structure of Figure 1 is assembled in a novel manner as follows: The annulus 22 is fitted into the recess 21, and these parts are then introduced into the outer race 10. The inner and outer races are then moved to an eccentric position, which is possible because the annulus 22 is accommodated by relief groove 26. While the races are eccentric the balls 12 are introduced into their retaining grooves. A separator is then placed in final position whereby the balls are spaced apart and the races caused to assume their normal concentric relation. The annulus 22 is now stressed laterally and its outer and inner margins are properly urged into sealing engagement with the outer and inner shoulders 18 and 19. Suitable lubricating grease is introduced into the space between the assemblies, and then the closure 16 is applied.

When the above assembly is in operation, and assuming that the inner race rotates, the annulus tends to remain stationary whereby all of the relative rotation occurs between the inner margin of the annulus and the associated shoulder 19. A film of viscous lubricating grease finds its way between the outer margin of the annulus and the shoulder 18, and aids in maintaining a good seal at this point. Also a thin film of lubricant finds its way between the inner margin of the annulus and the face of the shoulder 19, and this aids in maintaining a proper seal, and reduces friction between the surfaces in rubbing contact.

It is desirable to coat one or more surfaces of the annuluses with a thin flexible composite coating which will reduce friction and wear. Thus a coating can be applied in the manner described in copending Saywell application Serial No. 105,479, filed July 19, 1949 (continuation-in-part of Serial No. 772,486, filed September 6, 1947).

In the embodiment of Figure 1 such a coating can be applied to the inner face of the annulus 22 so that it is interposed between the inner margin of the annulus and the shoulder 19. Such a coating aids in reducing friction between the surfaces in rubbing contact, and also aids in securing the desired seal. A similar coating can be applied to the outer face of the annulus in order to protect the same against corrosion and to facilitate maintaining the desired seal against the outer shoulder 18.

Figure 2 illustrates another embodiment which is similar to Figure 1 except that the outer and inner shoulders are reversed and the recess 26 (in Figure 1) is formed in the inner race. Thus the outer race 31 is provided with the outwardly faced shoulder 32, and the inner race 33 provided with the inwardly faced shoulder 34 and the relief groove 36. The spring metal annulus 37 is stressed laterally and engages the shoulder faces 38 and 39. The face 38 is in contact with the outer margin of the annulus, while the inner margin of the annulus engages the face 39. The annulus is generally centered by the cylindrical bore 41, which is only slightly larger than the diameter of the annulus.

The embodiment of Figure 2 can be assembled in the same manner as described for Figure 1. The annular groove or recess 36 permits eccentric positioning of the two races for insertion of the balls. When assembly has been completed and the spacer inserted, the shoulders 32 and 34 assume their positions illustrated in Figure 2 to stress the annulus laterally and to provide for the necessary sealing contacts.

It will be evident from the foregoing that my invention is of extreme simplicity and lends itself to large scale manufacturing and assembling operations. The number of parts required is reduced to a minimum and seals can be made having a life comparable to the life of the complete assembly. Because shoulders 32 and 34 are formed integral with the outer and inner races the entire sealing means comprises a single simple part which is included in the complete assembly during manufacture and which does not require the use of supplemental locking or retaining means.

I claim:

1. In a ball bearing assembly having outer and inner relatively rotatable races, the races having oppositely faced ball accommodating grooves, a relatively thin annulus of spring metal, the annulus being uninterrupted both radially and circumferentially, and oppositely faced annular shoulders formed on corresponding end portions of the races, the faces of said shoulders extending generally in a radial direction and offset inwardly from the end faces of the races, the outer and inner peripheral margins of the annulus being disposed in overlapping relation with the faces of said shoulders and said annulus being sprung laterally within its elastic limit to urge the side faces of said margins into interface sealing contact with said shoulders, one of said races having a relief groove in a region adjacent the corresponding periphery of the annulus, said groove being of substantial radial depth to enable a substantial amount of eccentric positioning of the races during assembly, said relief groove having a depth as measured radially from said corresponding periphery which is sufficient to enable insertion of balls between the races and into the grooves while the races are so eccentrically disposed and while the annulus is located generally adjacent the faces of said shoulders.

2. An assembly as in claim 1 in which the relief groove is formed in the outer race and in which the outer diameter of the annulus is slightly less than the bore of the outer race which extends from one end thereof to said groove.

3. An assembly as in claim 1 in which the relief groove is formed in the inner race and in which the inner diameter of the annulus is slightly greater than the periphery of the outer race which extends from one end thereof to said groove.

4. In a ball bearing assembly having outer and inner relatively rotatable races, the races having oppositely faced ball accommodating grooves, a relatively thin annulus of spring metal, the annulus being uninterrupted both radially and circumferentially, and inwardly and outwardly faced shoulders on corresponding end portions of the races, the faces of said shoulders extending generally in a radial direction and being offset inwardly from the adjacent end faces of the races, the outer end margins of the races being disposed in overlapping relation with the faces of said shoulders and said annulus being normally sprung laterally within its elastic limit to urge the side faces of said margins into interface contact with said shoulders, one of said races having a relief groove in a margin adjacent the inwardly faced shoulder and the corresponding periphery of the annulus, said groove being of substantial radial depth to enable a substantial amount of eccentric positioning of the races during assembly, said relief groove having a depth measuring radially from said corresponding periphery which is sufficient to enable insertion of balls between the races and into the grooves while the races are so eccentrically disposed and while the annulus is located generally adjacent the faces of said shoulders.

References Cited in the file of this patent

UNITED STATES PATENTS

| Number | Name | Date |
| --- | --- | --- |
| 2,566,448 | Heintz et al. | Sept. 4, 1951 |
| 2,600,433 | Saywell | June 17, 1952 |